US00RE49256E

(19) United States
(12) Reissued Patent
Shabtay et al.

(10) Patent Number: US RE49,256 E
(45) Date of Reissued Patent: *Oct. 18, 2022

(54) HIGH RESOLUTION THIN MULTI-APERTURE IMAGING SYSTEMS

(71) Applicant: Corephotonics Ltd., Tel-Aviv (IL)

(72) Inventors: Gal Shabtay, Tel-Aviv (IL); Noy Cohen, Tel-Aviv (IL); Oded Gigushinski, Herzlia (IL); Ephraim Goldenberg, Ashdod (IL)

(73) Assignee: Corephotonics Ltd., Tel Aviv (IL)

( * ) Notice: This patent is subject to a terminal disclaimer.

(21) Appl. No.: 16/419,604

(22) Filed: May 22, 2019

Related U.S. Patent Documents

Reissue of:
(64) Patent No.: 9,876,952
Issued: Jan. 23, 2018
Appl. No.: 15/375,090
Filed: Dec. 11, 2016

U.S. Applications:
(63) Continuation of application No. 16/383,618, filed on Apr. 14, 2019, now Pat. No. Re. 48,444, which is an
(Continued)

(51) Int. Cl.
*H04N 5/232* (2006.01)
*G06T 5/20* (2006.01)
(Continued)

(52) U.S. Cl.
CPC ..... *H04N 5/23232* (2013.01); *G01J 3/0208* (2013.01); *G01J 3/0229* (2013.01);
(Continued)

(58) Field of Classification Search
CPC ..... H04N 5/232; H04N 9/09; H04N 5/225; H04N 9/04; H04N 5/23232;
(Continued)

(56) References Cited

U.S. PATENT DOCUMENTS 4,199,785 A 4/1980 McCullough et al.
5,005,083 A 4/1991 Grage et al.
(Continued)

FOREIGN PATENT DOCUMENTS

CN 101276415 A 10/2008
CN 201514511 U 6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Mark Sager
(74) *Attorney, Agent, or Firm* — Nathan & Associates; Menachem Nathan

(57) ABSTRACT

A multi-aperture imaging system comprising a first camera with a first sensor that captures a first image and a second camera with a second sensor that captures a second image, the two cameras having either identical or different FOVs. The first sensor may have a standard color filter array (CFA) covering one sensor section and a non-standard color CFA covering another. The second sensor may have either Clear or standard CFA covered sections. Either image may be chosen to be a primary or an auxiliary image, based on a zoom factor. An output image with a point of view determined by the primary image is obtained by registering the auxiliary image to the primary image.

5 Claims, 7 Drawing Sheets

Related U.S. Application Data application for the reissue of Pat. No. 9,876,952, which is a continuation of application No. 14/386,823, filed as application No. PCT/IB2013/060356 on Nov. 23, 2013, now Pat. No. 9,538,152.

(60) Provisional application No. 61/730,570, filed on Nov. 28, 2012.

(51) Int. Cl.

| | |
|---|---|
| ***H04N 5/225*** | (2006.01) |
| ***H04N 9/04*** | (2006.01) |
| ***H04N 9/73*** | (2006.01) |
| ***H04N 9/097*** | (2006.01) |
| ***H04N 9/09*** | (2006.01) |
| ***G01J 3/02*** | (2006.01) |
| ***G01J 3/36*** | (2006.01) |
| ***G01J 3/28*** | (2006.01) |
| ***G02B 5/18*** | (2006.01) |
| ***G01J 3/18*** | (2006.01) |
| ***G06T 7/00*** | (2017.01) |
| ***G06T 11/60*** | (2006.01) |
| ***G06T 7/33*** | (2017.01) |
| ***H04N 5/33*** | (2006.01) |

(52) U.S. Cl.

CPC ..... *G01J 3/0248* (2013.01); *G01J 3/18* (2013.01); *G01J 3/2823* (2013.01); *G01J 3/36* (2013.01); *G02B 5/1814* (2013.01); *G02B 5/1842* (2013.01); *G06T 5/20* (2013.01); *G06T 7/00* (2013.01); *G06T 7/33* (2017.01); *G06T 7/337* (2017.01); *G06T 11/60* (2013.01); *H04N 5/225* (2013.01); *H04N 5/2258* (2013.01); *H04N 5/232* (2013.01); *H04N 5/23238* (2013.01); *H04N 5/23296* (2013.01); *H04N 5/332* (2013.01); *H04N 9/04* (2013.01); *H04N 9/04515* (2018.08); *H04N 9/04555* (2018.08); *H04N 9/04557* (2018.08); *H04N 9/04559* (2018.08); *H04N 9/09* (2013.01); *H04N 9/097* (2013.01); *H04N 9/735* (2013.01); *G06T 2207/20221* (2013.01); *H04N 2209/045* (2013.01)

(58) Field of Classification Search

CPC ..... H04N 9/04557; H04N 9/04559; H04N 9/04555; H04N 9/04515; H04N 5/23238; H04N 5/332; H04N 5/23296; H04N 9/097; H04N 9/735; H04N 5/2258; H04N 2209/045; G06T 11/60; G06T 7/00; G06T 5/20; G06T 7/33; G06T 7/337; G06T 2207/20221; G01J 3/0208; G01J 3/0229; G01J 3/0248; G01J 3/18; G01J 3/2823; G01J 3/36; G02B 5/1814; G02B 5/1842

See application file for complete search history.

(56) References Cited

U.S. PATENT DOCUMENTS

| | | | |
|---|---|---|---|
| 5,032,917 | A | 7/1991 | Aschwanden |
| 5,041,852 | A | 8/1991 | Misawa et al. |
| 5,051,830 | A | 9/1991 | von Hoessle |
| 5,099,263 | A | 3/1992 | Matsumoto et al. |
| 5,248,971 | A | 9/1993 | Mandl |
| 5,287,093 | A | 2/1994 | Amano et al. |
| 5,394,520 | A | 2/1995 | Hall |
| 5,436,660 | A | 7/1995 | Sakamoto |
| 5,444,478 | A | 8/1995 | Lelong et al. |
| 5,459,520 | A | 10/1995 | Sasaki |
| 5,657,402 | A | 8/1997 | Bender et al. |
| 5,682,198 | A | 10/1997 | Katayama et al. |
| 5,768,443 | A | 6/1998 | Michael et al. |
| 5,926,190 | A | 7/1999 | Turkowski et al. |
| 5,940,641 | A | 8/1999 | McIntyre et al. |
| 5,982,951 | A | 11/1999 | Katayama et al. |
| 6,101,334 | A | 8/2000 | Fantone |
| 6,128,416 | A | 10/2000 | Oura |
| 6,148,120 | A | 11/2000 | Sussman |
| 6,208,765 | B1 | 3/2001 | Bergen |
| 6,268,611 | B1 | 7/2001 | Pettersson et al. |
| 6,549,215 | B2 | 4/2003 | Jouppi |
| 6,611,289 | B1 | 8/2003 | Yu et al. |
| 6,643,416 | B1 | 11/2003 | Daniels et al. |
| 6,650,368 | B1 | 11/2003 | Doron |
| 6,680,748 | B1 | 1/2004 | Monti |
| 6,714,665 | B1 | 3/2004 | Hanna et al. |
| 6,724,421 | B1 | 4/2004 | Glatt |
| 6,738,073 | B2 | 5/2004 | Park et al. |
| 6,741,250 | B1 | 5/2004 | Furlan et al. |
| 6,750,903 | B1 | 6/2004 | Miyatake et al. |
| 6,778,207 | B1 | 8/2004 | Lee et al. |
| 7,002,583 | B2 | 2/2006 | Rabb, III |
| 7,015,954 | B1 | 3/2006 | Foote et al. |
| 7,038,716 | B2 | 5/2006 | Klein et al. |
| 7,199,348 | B2 | 4/2007 | Olsen et al. |
| 7,206,136 | B2 | 4/2007 | Labaziewicz et al. |
| 7,248,294 | B2 | 7/2007 | Slatter |
| 7,256,944 | B2 | 8/2007 | Labaziewicz et al. |
| 7,305,180 | B2 | 12/2007 | Labaziewicz et al. |
| 7,339,621 | B2 | 3/2008 | Fortier |
| 7,346,217 | B1 | 3/2008 | Gold, Jr. |
| 7,365,793 | B2 | 4/2008 | Cheatle et al. |
| 7,411,610 | B2 | 8/2008 | Doyle |
| 7,424,218 | B2 | 9/2008 | Baudisch et al. |
| 7,509,041 | B2 | 3/2009 | Hosono |
| 7,533,819 | B2 | 5/2009 | Barkan et al. |
| 7,561,191 | B2 | 7/2009 | May et al. |
| 7,619,683 | B2 | 11/2009 | Davis |
| 7,676,146 | B2 | 3/2010 | Border et al. |
| 7,738,016 | B2 | 6/2010 | Toyofuku |
| 7,773,121 | B1 | 8/2010 | Huntsberger et al. |
| 7,809,256 | B2 | 10/2010 | Kuroda et al. |
| 7,880,776 | B2 | 2/2011 | LeGall et al. |
| 7,918,398 | B2 | 4/2011 | Li et al. |
| 7,964,835 | B2 | 6/2011 | Olsen et al. |
| 7,978,239 | B2 | 7/2011 | Deever et al. |
| 8,094,208 | B2 * | 1/2012 | Myhrvold ..... H04N 5/2254 348/222.1 |
| 8,115,825 | B2 | 2/2012 | Culbert et al. |
| 8,134,115 | B2 | 3/2012 | Koskinen et al. |
| 8,149,327 | B2 | 4/2012 | Lin et al. |
| 8,154,610 | B2 | 4/2012 | Jo et al. |
| 8,179,457 | B2 | 5/2012 | Koskinen et al. |
| 8,238,695 | B1 | 8/2012 | Davey et al. |
| 8,274,552 | B2 | 9/2012 | Dahi et al. |
| 8,390,729 | B2 | 3/2013 | Long et al. |
| 8,391,697 | B2 | 3/2013 | Cho et al. |
| 8,400,555 | B1 | 3/2013 | Georgiev et al. |
| 8,439,265 | B2 | 5/2013 | Ferren et al. |
| 8,446,484 | B2 | 5/2013 | Muukki et al. |
| 8,483,452 | B2 | 7/2013 | Ueda et al. |
| 8,514,491 | B2 | 8/2013 | Duparre |
| 8,542,287 | B2 | 9/2013 | Griffith et al. |
| 8,547,389 | B2 | 10/2013 | Hoppe et al. |
| 8,553,106 | B2 | 10/2013 | Scarff |
| 8,587,691 | B2 | 11/2013 | Takane |
| 8,619,148 | B1 | 12/2013 | Watts et al. |
| 8,660,420 | B2 | 2/2014 | Chang |
| 8,803,990 | B2 | 8/2014 | Smith |
| 8,896,655 | B2 | 11/2014 | Mauchly et al. |
| 8,976,255 | B2 | 3/2015 | Matsuoto et al. |
| 9,019,387 | B2 | 4/2015 | Nakano |
| 9,025,073 | B2 | 5/2015 | Attar et al. |
| 9,025,077 | B2 | 5/2015 | Attar et al. |
| 9,041,835 | B2 | 5/2015 | Honda |
| 9,137,447 | B2 | 9/2015 | Shibuno |
| 9,185,291 | B1 | 11/2015 | Shabtay et al. |
| 9,215,377 | B2 | 12/2015 | Sokeila et al. |
| 9,215,385 | B2 | 12/2015 | Luo |

(56) References Cited

U.S. PATENT DOCUMENTS 9,270,875 B2 2/2016 Brisedoux et al.
9,286,680 B1 3/2016 Jiang et al.
9,344,626 B2 5/2016 Silverstein et al.
9,360,671 B1 6/2016 Zhou
9,369,621 B2 6/2016 Malone et al.
9,413,930 B2 8/2016 Geerds
9,413,984 B2 8/2016 Attar et al.
9,420,180 B2 8/2016 Jin
9,438,792 B2 9/2016 Nakada et al.
9,485,432 B1 11/2016 Medasani et al.
9,578,257 B2 2/2017 Attar et al.
9,618,748 B2 4/2017 Munger et al.
9,681,057 B2 6/2017 Attar et al.
9,723,220 B2 8/2017 Sugie
9,736,365 B2 8/2017 Laroia
9,736,391 B2 8/2017 Du et al.
9,768,310 B2 9/2017 Ahn et al.
9,800,798 B2 10/2017 Ravirala et al.
9,851,803 B2 12/2017 Fisher et al.
9,894,287 B2 2/2018 Qian et al.
9,900,522 B2 2/2018 Lu
9,927,600 B2 3/2018 Goldenberg et al.
2002/0005902 A1 1/2002 Yuen
2002/0030163 A1 3/2002 Zhang
2002/0063711 A1 5/2002 Park et al.
2002/0075258 A1 6/2002 Park et al.
2002/0122113 A1 9/2002 Foote
2002/0167741 A1 11/2002 Koiwai et al.
2003/0030729 A1 2/2003 Prentice et al.
2003/0093805 A1 5/2003 Gin
2003/0160886 A1 8/2003 Misawa et al.
2003/0202113 A1 10/2003 Yoshikawa
2004/0008773 A1 1/2004 Itokawa
2004/0012683 A1 1/2004 Yamasaki et al.
2004/0017386 A1 1/2004 Liu et al.
2004/0027367 A1 2/2004 Pilu
2004/0061788 A1 4/2004 Bateman
2004/0141065 A1 7/2004 Hara et al.
2004/0141086 A1 7/2004 Mihara
2004/0240052 A1 12/2004 Minefuji et al.
2005/0013509 A1 1/2005 Samadani
2005/0046740 A1 3/2005 Davis
2005/0157184 A1 7/2005 Nakanishi et al.
2005/0168834 A1 8/2005 Matsumoto et al.
2005/0185049 A1 8/2005 Iwai et al.
2005/0200718 A1 9/2005 Lee
2006/0054782 A1 3/2006 Olsen et al.
2006/0056056 A1 3/2006 Ahiska et al.
2006/0067672 A1 3/2006 Washisu et al.
2006/0102907 A1 5/2006 Lee et al.
2006/0125937 A1 6/2006 LeGall et al.
2006/0170793 A1 8/2006 Pasquarette et al.
2006/0175549 A1 8/2006 Miller et al.
2006/0187310 A1 8/2006 Janson et al.
2006/0187322 A1 8/2006 Janson et al.
2006/0187338 A1 8/2006 May et al.
2006/0227236 A1 10/2006 Pak
2007/0024737 A1 2/2007 Nakamura et al.
2007/0126911 A1 6/2007 Nanjo
2007/0127040 A1 6/2007 Davidovici
2007/0177025 A1 8/2007 Kopet et al.
2007/0188653 A1 8/2007 Pollock et al.
2007/0189386 A1 8/2007 Imagawa et al.
2007/0257184 A1 11/2007 Olsen et al.
2007/0285550 A1 12/2007 Son
2008/0017557 A1 1/2008 Witdouck
2008/0024614 A1 1/2008 Li et al.
2008/0025634 A1 1/2008 Border et al.
2008/0030592 A1 2/2008 Border et al.
2008/0030611 A1 2/2008 Jenkins
2008/0084484 A1 4/2008 Ochi et al.
2008/0106629 A1 5/2008 Kurtz et al.
2008/0117316 A1 5/2008 Orimoto
2008/0129831 A1 6/2008 Cho et al.
2008/0218611 A1 9/2008 Parulski et al.
2008/0218612 A1 9/2008 Border et al.
2008/0218613 A1 9/2008 Janson et al.
2008/0219654 A1 9/2008 Border et al.
2009/0086074 A1 4/2009 Li et al.
2009/0109556 A1 4/2009 Shimizu et al.
2009/0122195 A1 5/2009 Van Baar et al.
2009/0122406 A1 5/2009 Rouvinen et al.
2009/0128644 A1 5/2009 Camp et al.
2009/0219547 A1 9/2009 Kauhanen et al.
2009/0252484 A1 10/2009 Hasuda et al.
2009/0295949 A1 12/2009 Ojala
2009/0324135 A1 12/2009 Kondo et al.
2010/0013906 A1 1/2010 Border et al.
2010/0020221 A1 1/2010 Tupman et al.
2010/0060746 A9 3/2010 Olsen et al.
2010/0097444 A1 4/2010 Lablans
2010/0103194 A1 4/2010 Chen et al.
2010/0165131 A1 7/2010 Makimoto et al.
2010/0196001 A1 8/2010 Ryynänen et al.
2010/0238327 A1 9/2010 Griffith et al.
2010/0259836 A1 10/2010 Kang et al.
2010/0277619 A1 11/2010 Scarff
2010/0283842 A1 11/2010 Guissin et al.
2010/0321494 A1 12/2010 Peterson et al.
2011/0058320 A1 3/2011 Kim et al.
2011/0063417 A1 3/2011 Peters et al.
2011/0063446 A1 3/2011 McMordie et al.
2011/0064327 A1* 3/2011 Dagher ..... G06T 5/004 382/263
2011/0080487 A1 4/2011 Venkataraman et al.
2011/0121421 A1 5/2011 Charbon et al.
2011/0128288 A1 6/2011 Petrou et al.
2011/0164172 A1 7/2011 Shintani et al.
2011/0216228 A1* 9/2011 Kawamura ..... H04N 5/335 348/273
2011/0229054 A1 9/2011 Weston et al.
2011/0234798 A1 9/2011 Chou
2011/0234853 A1 9/2011 Hayashi et al.
2011/0234881 A1 9/2011 Wakabayashi et al.
2011/0242286 A1 10/2011 Pace et al.
2011/0242355 A1 10/2011 Goma et al.
2011/0285730 A1 11/2011 Lai et al.
2011/0292258 A1 12/2011 Adler et al.
2011/0298966 A1 12/2011 Kirschstein et al.
2012/0026366 A1 2/2012 Golan et al.
2012/0044372 A1 2/2012 Cote et al.
2012/0062780 A1 3/2012 Morihisa
2012/0069235 A1 3/2012 Imai
2012/0075489 A1 3/2012 Nishihara
2012/0081566 A1* 4/2012 Cote ..... H04N 5/2256 348/222.1
2012/0105579 A1 5/2012 Jeon et al.
2012/0124525 A1 5/2012 Kang
2012/0154547 A1 6/2012 Aizawa
2012/0154614 A1 6/2012 Moriya et al.
2012/0196648 A1 8/2012 Havens et al.
2012/0229663 A1 9/2012 Nelson et al.
2012/0249815 A1 10/2012 Bohn et al.
2012/0287315 A1 11/2012 Huang et al.
2012/0320467 A1 12/2012 Baik et al.
2013/0002928 A1 1/2013 Imai
2013/0016427 A1 1/2013 Sugawara
2013/0063629 A1 3/2013 Webster et al.
2013/0076922 A1 3/2013 Shihoh et al.
2013/0093842 A1 4/2013 Yahata
2013/0094126 A1 4/2013 Rappoport et al.
2013/0113894 A1 5/2013 Mirlay
2013/0135445 A1 5/2013 Dahi et al.
2013/0136355 A1* 5/2013 Demandolx ..... H04N 5/3572 382/167
2013/0155176 A1 6/2013 Paripally et al.
2013/0182150 A1 7/2013 Asakura
2013/0201360 A1 8/2013 Song
2013/0202273 A1 8/2013 Ouedraogo et al.
2013/0235224 A1 9/2013 Park et al.
2013/0250150 A1 9/2013 Malone et al.
2013/0258044 A1 10/2013 Betts-LaCroix
2013/0270419 A1 10/2013 Singh et al.
2013/0278785 A1 10/2013 Nomura et al.

(56) References Cited

U.S. PATENT DOCUMENTS

| | | | |
|---|---|---|---|
| 2013/0321668 | A1 | 12/2013 | Kamath |
| 2014/0009631 | A1 | 1/2014 | Topliss |
| 2014/0049615 | A1 | 2/2014 | Uwagawa |
| 2014/0118584 | A1 | 5/2014 | Lee et al. |
| 2014/0192238 | A1 | 7/2014 | Attar et al. |
| 2014/0192253 | A1 | 7/2014 | Laroia |
| 2014/0218587 | A1 | 8/2014 | Shah |
| 2014/0313316 | A1 | 10/2014 | Olsson et al. |
| 2014/0362242 | A1 | 12/2014 | Takizawa |
| 2015/0002683 | A1 | 1/2015 | Hu et al. |
| 2015/0042870 | A1 | 2/2015 | Chan et al. |
| 2015/0070781 | A1 | 3/2015 | Cheng et al. |
| 2015/0092066 | A1 | 4/2015 | Geiss et al. |
| 2015/0103147 | A1 | 4/2015 | Ho et al. |
| 2015/0138381 | A1 | 5/2015 | Ahn |
| 2015/0154776 | A1 | 6/2015 | Zhang et al. |
| 2015/0162048 | A1 | 6/2015 | Hirata et al. |
| 2015/0195458 | A1 | 7/2015 | Nakayama et al. |
| 2015/0215516 | A1 | 7/2015 | Dolgin |
| 2015/0237280 | A1 | 8/2015 | Choi et al. |
| 2015/0242994 | A1 | 8/2015 | Shen |
| 2015/0244906 | A1 | 8/2015 | Wu et al. |
| 2015/0253543 | A1 | 9/2015 | Mercado |
| 2015/0253647 | A1 | 9/2015 | Mercado |
| 2015/0261299 | A1 | 9/2015 | Wajs |
| 2015/0271471 | A1 | 9/2015 | Hsieh et al. |
| 2015/0281678 | A1 | 10/2015 | Park et al. |
| 2015/0286033 | A1 | 10/2015 | Osborne |
| 2015/0316744 | A1 | 11/2015 | Chen |
| 2015/0334309 | A1 | 11/2015 | Peng et al. |
| 2016/0044250 | A1 | 2/2016 | Shabtay et al. |
| 2016/0070088 | A1 | 3/2016 | Koguchi |
| 2016/0154202 | A1 | 6/2016 | Wippermann et al. |
| 2016/0154204 | A1 | 6/2016 | Lim et al. |
| 2016/0212358 | A1 | 7/2016 | Shikata |
| 2016/0212418 | A1 | 7/2016 | Demirdjian et al. |
| 2016/0241751 | A1 | 8/2016 | Park |
| 2016/0291295 | A1 | 10/2016 | Shabtay et al. |
| 2016/0295112 | A1 | 10/2016 | Georgiev et al. |
| 2016/0301840 | A1 | 10/2016 | Du et al. |
| 2016/0353008 | A1 | 12/2016 | Osborne |
| 2016/0353012 | A1 | 12/2016 | Kao et al. |
| 2017/0019616 | A1 | 1/2017 | Zhu et al. |
| 2017/0070731 | A1 | 3/2017 | Darling et al. |
| 2017/0187962 | A1 | 6/2017 | Lee et al. |
| 2017/0214846 | A1 | 7/2017 | Du et al. |
| 2017/0214866 | A1 | 7/2017 | Zhu et al. |
| 2017/0242225 | A1 | 8/2017 | Fiske |
| 2017/0289458 | A1 | 10/2017 | Song et al. |
| 2018/0013944 | A1 | 1/2018 | Evans, V et al. |
| 2018/0017844 | A1 | 1/2018 | Yu et al. |
| 2018/0024329 | A1 | 1/2018 | Goldenberg et al. |
| 2018/0059379 | A1 | 3/2018 | Chou |
| 2018/0120674 | A1 | 5/2018 | Avivi et al. |
| 2018/0150973 | A1 | 5/2018 | Tang et al. |
| 2018/0176426 | A1 | 6/2018 | Wei et al. |
| 2018/0198897 | A1 | 7/2018 | Tang et al. |
| 2018/0241922 | A1 | 8/2018 | Baldwin et al. |
| 2018/0295292 | A1 | 10/2018 | Lee et al. |
| 2018/0300901 | A1 | 10/2018 | Wakai et al. |
| 2019/0121103 | A1 | 4/2019 | Bachar et al. |

FOREIGN PATENT DOCUMENTS

| | | | |
|---|---|---|---|
| CN | 102739949 | A | 10/2012 |
| CN | 103024272 | A | 4/2013 |
| CN | 103841404 | A | 6/2014 |
| EP | 1536633 | A1 | 6/2005 |
| EP | 1780567 | A1 | 5/2007 |
| EP | 2523450 | A1 | 11/2012 |
| JP | S59191146 | A | 10/1984 |
| JP | 04211230 | A | 8/1992 |
| JP | H07318864 | A | 12/1995 |
| JP | 08271976 | A | 10/1996 |
| JP | 2002010276 | A | 1/2002 |
| JP | 2003298920 | A | 10/2003 |
| JP | 2004133054 | A | 4/2004 |
| JP | 2004245982 | A | 9/2004 |
| JP | 2005099265 | A | 4/2005 |
| JP | 2006238325 | A | 9/2006 |
| JP | 2007228006 | A | 9/2007 |
| JP | 2007306282 | A | 11/2007 |
| JP | 2008076485 | A | 4/2008 |
| JP | 2010204341 | A | 9/2010 |
| JP | 2011085666 | A | 4/2011 |
| JP | 2013106289 | A | 5/2013 |
| KR | 20070005946 | A | 1/2007 |
| KR | 20090058229 | A | 6/2009 |
| KR | 20100008936 | A | 1/2010 |
| KR | 20140014787 | A | 2/2014 |
| KR | 101477178 | B1 | 12/2014 |
| KR | 20140144126 | A | 12/2014 |
| KR | 20150118012 | A | 10/2015 |
| WO | 2000027131 | A2 | 5/2000 |
| WO | 2004084542 | A1 | 9/2004 |
| WO | 2006008805 | A1 | 1/2006 |
| WO | 2009097552 | | 8/2009 |
| WO | 2010122841 | A1 | 10/2010 |
| WO | 2014072818 | A2 | 5/2014 |
| WO | 2017025822 | A1 | 2/2017 |
| WO | 2017037688 | A1 | 3/2017 |
| WO | 2018130898 | A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM Siggraph, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM Siggraph, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Office Action in related CN patent application No. 202110100089.9, dated Jul. 21, 2021.
International Search Report and Written Opinion issued in related PCT patent application PCT/IB2013/060356, dated Apr. 17, 2014, 15 pages.

* cited by examiner

200

300

600

700

HIGH RESOLUTION THIN MULTI-APERTURE IMAGING SYSTEMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[This application is a Continuation application of U.S. patent application Ser. No. 14/386,823 (now allowed), which was a National Phase application from PCT patent application PCT/IB2013/060356 which claimed priority from U.S. Provisional Patent Application No. 61/730,570 having the same title and filed Nov. 28, 2012, the latter incorporated herein by reference in its entirety.] *This broadening reissue application is a continuation of U.S. patent application Ser. No. 16/383,618, filed Apr. 14, 2019, now U.S. Pat. No. RE48,4544E, which is a reissue application of U.S. patent application Ser. No. 15/375,090, filed Dec. 11, 2016, now U.S. Pat. No. 9,876,952, which is a continuation of U.S. patent application Ser. No. 14/386,823, filed Apr. 22, 2014, now U.S. Pat. No. 9,538,152, which was a National Phase application from PCT application PCT/IB2013/060356 which claimed priority from U.S. Provisional Patent Application No. 61/730,570 having the same title and filed Nov. 28, 2012, the latter incorporated herein by reference in its entirety. The following three co-pending applications are also continuation reissue applications of U.S. patent application Ser. No. 16/383,618, filed Apr. 14, 2019: U.S. patent application Ser. No. 16/384,140, filed Apr. 15, 2019, U.S. patent application Ser. No. 16/384,197, filed Apr. 15, 2019, and U.S. patent application Ser. No. 16/384,244, filed Apr. 15, 2019.*

FIELD

Embodiments disclosed herein relate in general to multi-aperture imaging ("MAI") systems (where "multi" refers to two or more apertures) and more specifically to thin MAI systems with high color resolution and/or optical zoom.

BACKGROUND

Small digital cameras integrated into mobile (cell) phones, personal digital assistants and music players are becoming ubiquitous. Each year, mobile phone manufacturers add more imaging features to their handsets, causing these mobile imaging devices to converge towards feature sets and image quality that customers expect from stand-alone digital still cameras. Concurrently, the size of these handsets is shrinking, making it necessary to reduce the total size of the camera accordingly while adding more imaging features. Optical Zoom is a primary feature of many digital still cameras but one that mobile phone cameras usually lack, mainly due to camera height constraints in mobile imaging devices, cost and mechanical reliability.

Mechanical zoom solutions are common in digital still cameras but are typically too thick for most camera phones. Furthermore, the F/# ("F number) in such systems typically increases with the zoom factor (ZF) resulting in poor light sensitivity and higher noise (especially in low-light scenarios). In mobile cameras, this also results in resolution compromise, due to the small pixel size of their image sensors and the diffraction limit optics associated with the F/#.

One way of implementing zoom in mobile cameras is by over-sampling the image and cropping and interpolating it in accordance with the desired ZF. While this method is mechanically reliable, it results in thick optics and in an expensive image sensor due to the large number of pixels so associated therewith. As an example, if one is interested in implementing a 12 Megapixel camera with X3 ZF, one needs a sensor of 108 Megapixels.

Another way of implementing zoom, as well as increasing the output resolution, is by using a dual-aperture imaging ("DAI") system. In its basic form, a DAI system includes two optical apertures which may be formed by one or two optical modules, and one or two image sensors (e.g., CMOS or CCD) that grab the optical image or images and convert the data into the electronic domain, where the image can be processed and stored.

The design of a thin MAI system with improved resolution requires a careful choice of parameters coupled with advanced signal processing algorithms to support the output of a high quality image. Known MAI systems, in particular ones with short optical paths, often trade-off functionalities and properties, for example zoom and color resolution, or image resolution and quality for camera module height. Therefore, there is a need for, and it would be advantageous to have thin MAI systems that produce an image with high resolution (and specifically high color resolution) together with zoom functionality.

Moreover, known signal processing algorithms used together with existing MAI systems often further degrade the output image quality by introducing artifacts when combining information from different apertures. A primary source of these artifacts is the image registration process, which has to find correspondences between the different images that are often captured by different sensors with different color filter arrays (CFAs). There is therefore a need for, and it would be advantageous to have an image registration algorithm that is more robust to the type of CFA used by the cameras and which can produce better correspondence between images captured by a multi-aperture system.

SUMMARY

Embodiments disclosed herein teach the use of multi-aperture imaging systems to implement thin cameras (with short optical paths of less than about 9 mm) and/or to realize optical zoom systems in such thin cameras. Embodiments disclosed herein further teach new color filter arrays that optimize the color information which may be achieved in a multi-aperture imaging system with or without zoom. In various embodiments, a MAI system disclosed herein includes at least two sensors or a single sensor divided into at least two areas. Hereinafter, the description refers to "two sensors", with the understanding that they may represent sections of a single physical sensor (imager chip). Exemplarily, in a dual-aperture imaging system, a left sensor (or left side of a single sensor) captures an image coming from a first aperture while a right sensor (or right side of a single sensor) captures an image coming from a second aperture. In various embodiments disclosed herein, one sensor is a "Wide" sensor while another sensor is a "Tele" sensor, see e.g. FIG. 1A. The Wide sensor includes either a single standard CFA or two different CFAs: a non-standard CFA with higher color sampling rate positioned in an "overlap area" of the sensor (see below description of FIG. 1B) and a standard CFA with a lower color sampling rate surrounding the overlap area. When including a single standard CFA, the CFA may cover the entire Wide sensor area. A "standard CFA" may include a RGB (Bayer) pattern or a non-Bayer pattern such as RGBE, CYYM, CYGM, RGBW#1, RGBW#2 or RGBW#3. Thus, reference may be made to "standard Bayer" or "standard non-Bayer" patterns or filters. As used herein, "non-standard CFA" refers to a CFA that is different in its pattern that CFAs listed above as "standard". Exemplary non-standard CFA patterns may include repetitions of a 2×2 micro-cell in which the color filter order is RR-BB, RB-BR or YC-CY where Y=Yellow=Green+Red, C=Cyan=Green+Blue; repetitions of a 3×3 micro-cell in which the color filter order is GBR-RGB-BRG; and repetitions of a 6×6 micro-cell in which the color filter order is RBBRRB-RWRBWB-BBRBRR-RRBRBB-BWBRWR-BRRBBR, or BBGRRG-RGRBGB-GBRGRB-RRGBBG-BGBRGR-GRBGBR, or RBBRRB-RGRBGB-BBRBRR-RRBRBB-BGBRGR-BRRBBR, or, RBRBRB-BGBRGR-RBRBRB-BRBRBR-RGRBGB-BRBRBR.

The Tele sensor may be a Clear sensor (i.e. a sensor without color filters) or a standard CFA sensor. This arrangement of the two (or more than two) sensors and of two (or more than two) Wide and Tele "subset cameras" (or simply "subsets") related to the two Wide and Tele subsets. Each sensor provides a separate image (referred to respectively as a Wide image and a Tele image), except for the case of a single sensor, where two images are captured (grabbed) by the single sensor (example above). In some embodiments, zoom is achieved by fusing the two images, resulting in higher color resolution that approaches that of a high quality dual-aperture zoom camera. Some thin MAI systems disclosed herein therefore provide zoom, super-resolution, high dynamic range and enhanced user experience.

In some embodiments, in order to reach optical zoom capabilities, a different magnification image of the same scene is grabbed by each subset, resulting in field of view (FOV) overlap between the two subsets. In some embodiments, the two subsets have the same zoom (i.e. same FOV). In some embodiments, the Tele subset is the higher zoom subset and the Wide subset is the lower zoom subset. Post processing is applied on the two images grabbed by the MAI system to fuse and output one fused (combined) output zoom image processed according to a user ZF input request. In some embodiments, the resolution of the fused image may be higher than the resolution of the Wide/Tele sensors. As part of the fusion procedure, up-sampling may be applied on the Wide image to scale it to the Tele image.

In an embodiment there is provided a multi-aperture imaging system comprising a first camera subset that provides a first image, the first camera subset having a first sensor with a first plurality of sensor pixels covered at least in part with a non-standard CFA, the non-standard CFA used to increase a specific color sampling rate relative to a same color sampling rate in a standard CFA; a second camera subset that provides a second image, the second camera subset having a second sensor with a second plurality of sensor pixels either Clear or covered with a standard CFA; and a processor configured to process the first and second images into a combined output image.

In some embodiments, the first and the second camera subsets have identical FOVs and the non-standard CFA may cover an overlap area that includes all the pixels of first sensor, thereby providing increased color resolution. In some such embodiments, the processor is further configured to, during the processing of the first and second images into a combined output image, register respective first and second Luma images obtained from the first and second images, the registered first and second Luma images used together with color information to form the combined output image. In an embodiment, the registration includes finding a corresponding pixel in the second Luma image for each pixel in the first Luma image, whereby the output image is formed by transferring information from the second image to the first image. In another embodiment, the registration includes finding a corresponding pixel in the first Luma image for each pixel in the second Luma image, whereby the output image is formed by transferring information from the first image to the second image.

In some embodiments, the first camera subset has a first FOV, the second camera subset has a second, smaller FOV than the first FOV, and the non-standard CFA covers an overlap area on the first sensor that captures the second FOV, thereby providing both optical zoom and increased color resolution. In some such embodiments, the processor is further configured to, during the processing of the first and second images into a combined output image and based on a ZF input, register respective first and second Luma images obtained from the first and second images, the registered first and second Luma images used together with color information to form the combined output image. For a ZF input that defines an FOV greater than the second FOV, the registration includes finding a corresponding pixel in the second Luma image for each pixel in the first Luma image and the processing includes forming the output image by transferring information from the second image to the first image. For a ZF input that defines an FOV smaller than or equal to the second FOV, the registration includes finding a corresponding pixel in the first Luma image for each pixel in the second Luma image, and the processing includes forming the output image by transferring information from the first image to the second image.

In an embodiment there is provided a multi-aperture imaging system comprising a first camera subset that provides a first image, the first camera subset having a first sensor with a first plurality of sensor pixels covered at least in part with a standard CFA; a second camera subset that provides a second image, the second camera subset having a second sensor with a second plurality of sensor pixels either Clear or covered with a standard CFA; and a processor configured to register first and second Luma images obtained respectively from the first and second images and to process the registered first and second Luma images together with color information into a combined output image.

In some embodiments, the first and the second camera subsets have identical first and second FOVs. In some such embodiments, the registration includes finding a corresponding pixel in the second Luma image for each pixel in the first Luma image and the processing includes forming the output image by transferring information from the second image to the first image. In other such embodiments, the registration includes finding a corresponding pixel in the first Luma image for each pixel in the second Luma image and the processing includes forming the output image by transferring information from the first image to the second image.

In some embodiments, the first camera subset has a first FOV, the second camera subset has a second, smaller FOV than the first FOV, and the processor is further configured to register the first and second Luma images based on a ZF input. For a ZF input that defines an FOV greater than the second FOV, the registration includes finding a corresponding pixel in the second Luma image for each pixel in the first Luma image and the processing includes forming the output image by transferring information from the second image to the first image. For a ZF input that defines an FOV smaller than or equal to the second FOV, the registration includes finding a corresponding pixel in the first Luma image for each pixel in the second Luma image, and the processing includes forming the output image by transferring information from the first image to the second image.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way.

DETAILED DESCRIPTION

Embodiments disclosed herein relate to multi-aperture imaging systems that include at least one Wide sensor with a single CFA or with two different CFAs and at least one Tele sensor. The description continues with particular reference to dual-aperture imaging systems that include two (Wide and Tele) subsets with respective sensors. A three-aperture imaging system is described later with reference to FIGS. 11A-11B.

The Wide sensor includes an overlap area (see description of FIG. 1B) that captures the Tele FOV. The overlap area may cover the entire Wide sensor or only part of the sensor. The overlap area may include a standard CFA or a non-standard CFA. Since the Tele image is optically magnified compared to the Wide image, the effective sampling rate of the Tele image is higher than that of the Wide image. Thus, the effective color sampling rate in the Wide sensor is much lower than the Clear sampling rate in the Tele sensor. In addition, the Tele and Wide images fusion procedure (see below) requires up-scaling of the color data from the Wide sensor. Up-scaling will not improve color resolution. In some applications, it is therefore advantageous to use a non-standard CFA in the Wide overlap area that increases color resolution for cases in which the Tele sensor includes only Clear pixels. In some embodiments in which the Tele sensor includes a Bayer CFA, the Wide sensor may have a Bayer CFA in the overlap area. In such embodiments, color resolution improvement depends on using color information from the Tele sensor in the fused output image.

Figure 1A:
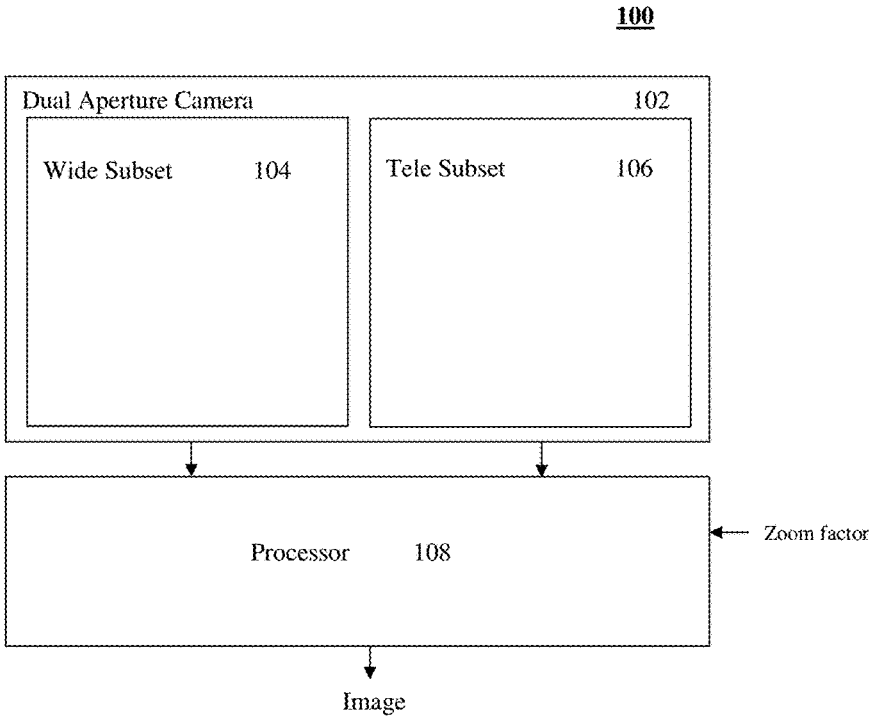
FIG. 1A shows schematically a block diagram illustrating a dual-aperture zoom imaging system disclosed herein.
Figure 1B:
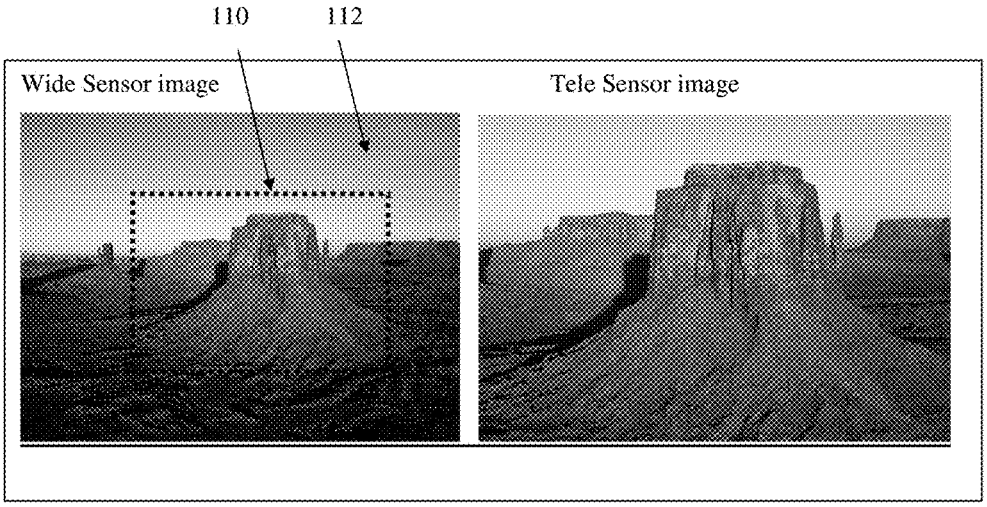
FIG. 1B shows an example of an image captured by the Wide sensor and the Tele sensor while illustrating the overlap area on the Wide sensor.

FIG. 1A shows schematically a block diagram illustrating a dual-aperture zoom imaging ("DAZI") system 100 disclosed herein. System 100 includes a dual-aperture camera 102 with a Wide subset 104 and a Tele subset 106 (each subset having a respective sensor), and a processor 108 that fuses two images, a Wide image obtained with the Wide subset and a Tele image obtained with the Tele subset, into a single fused output image according to a user-defined "applied" ZF input or request. The ZF is input to processor 108. The Wide sensor may include a non-standard CFA in an overlap area illustrated by 110 in FIG. 1B. Overlap area 110 is surrounded by a non-overlap area 112 with a standard CFA (for example a Bayer pattern). FIG. 1B also shows an example of an image captured by both Wide and Tele sensors. Note that "overlap" and "non-overlap" areas refer to parts of the Wide image as well as to the CFA arrangements of the Wide sensor. The overlap area may cover different portions of a Wide sensor, for example half the sensor area, a third of the sensor area, a quarter of the sensor area, etc. A number of such Wide sensor CFA arrangements are described in more detail with reference to FIGS. 2-9. The non-standard CFA pattern increases the color resolution of the DAZI system.

The Tele sensor may be Clear (providing a Tele Clear image scaled relative to the Wide image) or may include a standard (Bayer or non-Bayer) CFA. It in the latter case, it is desirable to define primary and auxiliary sensors based on the applied ZF. If the ZF is such that the output FOV is larger than the Tele FOV, the primary sensor is the Wide sensor and the auxiliary sensor is the Tele sensor. If the ZF is such that the output FOV is equal to, or smaller than the Tele FOV, the primary sensor is the Tele sensor and the auxiliary sensor is the Wide sensor. The point of view defined by the output image is that of the primary sensor.

Figure 2:
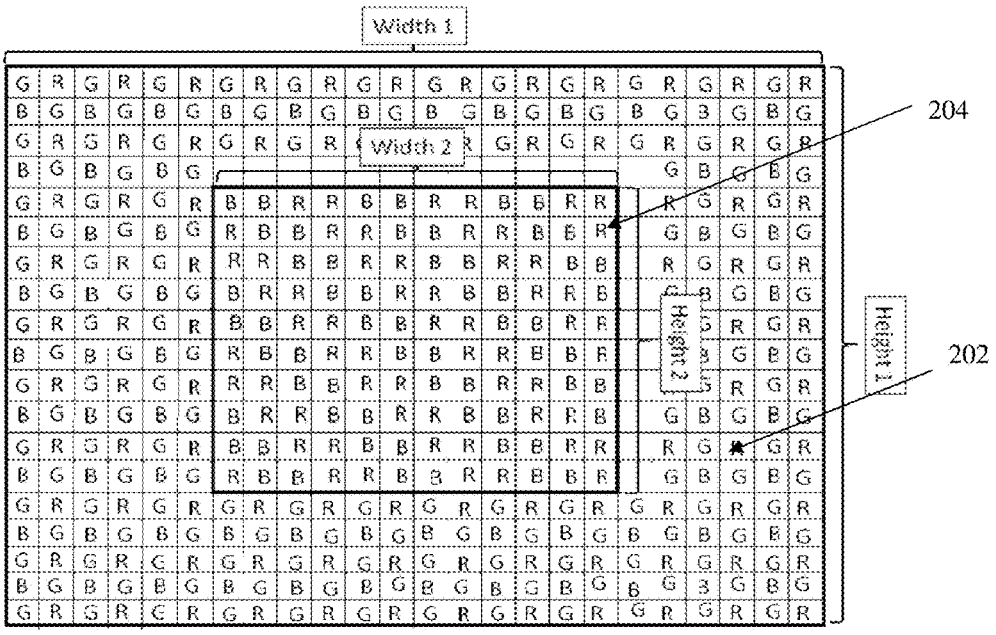
FIG. 2 shows schematically an embodiment of a Wide sensor that may be implemented in a dual-aperture zoom imaging system disclosed herein.

FIG. 2 shows schematically an embodiment of a Wide sensor 200 that may be implemented in a DAZI system such as system 100. Sensor 200 has a non-overlap area 202 with a Bayer CFA and an overlap area 204 covered by a non-standard CFA with a repetition of a 4×4 micro-cell in which the color filter order is BBRR-RBBR-RRBB-BRRB. In this figure, as well as in FIGS. 3-9, "Width 1" and "Height 1" refer to the full Wide sensor dimension. "Width 2" and "Height 2" refer to the dimensions of the Wide sensor overlap area. Note that in FIG. 2 (as in following FIGS. 3-5 and 7, 8) the empty row and column to the left and top of the overlap area are for clarity purposes only, and that the sensor pixels follow there the pattern of the non-overlap area (as shown in FIG. 6). In overlap area 204, R and B are sampled at $\frac{1}{2}^{0.5}$ Nyquist frequency in the diagonal (left to right)

direction with 2 pixel intervals instead of at ½ Nyquist frequency in a standard Bayer pattern.

Figure 3:
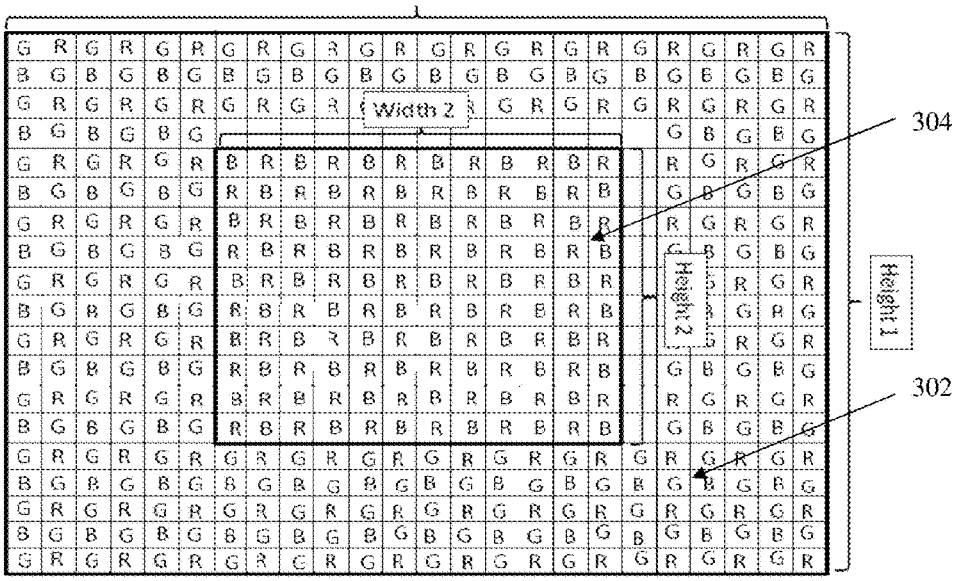
FIG. 3 shows schematically another embodiment of a Wide camera sensor that may be implemented in a dual-aperture zoom imaging system disclosed herein.

FIG. 3 shows schematically an embodiment of a Wide sensor 300 that may be implemented in a DAZI system such as system 100. Sensor 300 has a non-overlap area 302 with a Bayer CFA and an overlap area 304 covered by a non-standard CFA with a repetition of a 2×2 micro-cell in which the color filter order is BR-RB. In the overlap area, R and B are sampled at $\frac{1}{2}^{0.5}$ Nyquist frequency in both diagonal directions.

Figure 4:
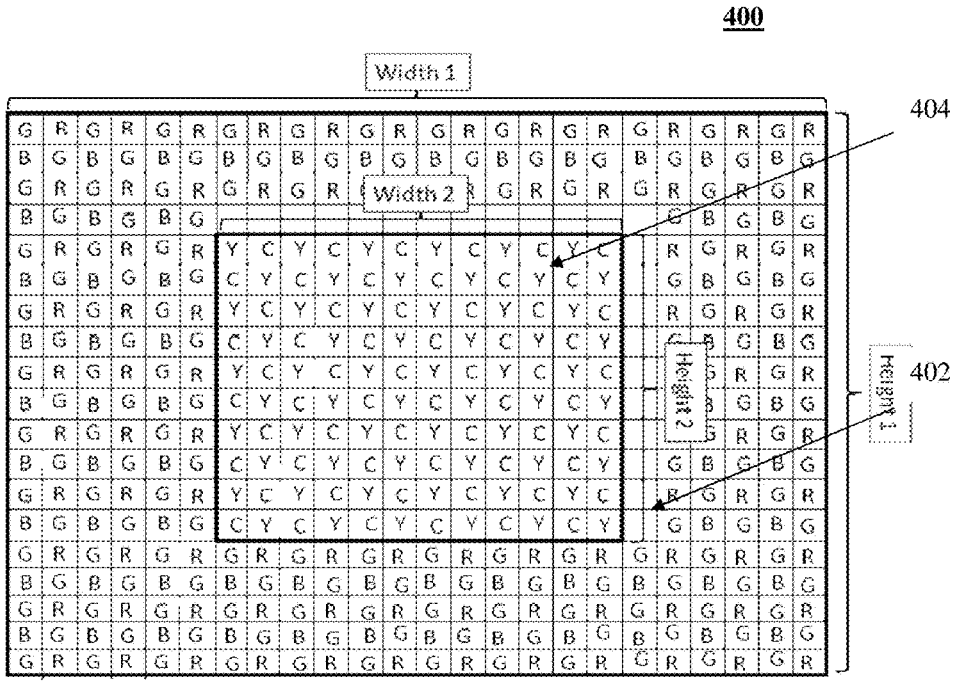
FIG. 4 shows schematically yet another embodiment of a Wide camera sensor that may be implemented in a dual-aperture zoom imaging system disclosed herein.

FIG. 4 shows schematically an embodiment of a Wide sensor 400 that may be implemented in a DAZI system such as system 100. Sensor 400 has a non-overlap area 402 with a Bayer CFA and an overlap area 404 covered by a non-standard CFA with a repetition of a 2×2 micro-cell in which the color filter order is YC-CY, where Y=Yellow=Green+Red, C=Cyan=Green+Blue. As a result, in the overlap area, R and B are sampled at $\frac{1}{2}^{0.5}$ Nyquist frequency in a diagonal direction. The non-standard CFA includes green information for registration purposes. This allows for example registration between the two images where the object is green, since there is green information in both sensor images.

Figure 5:
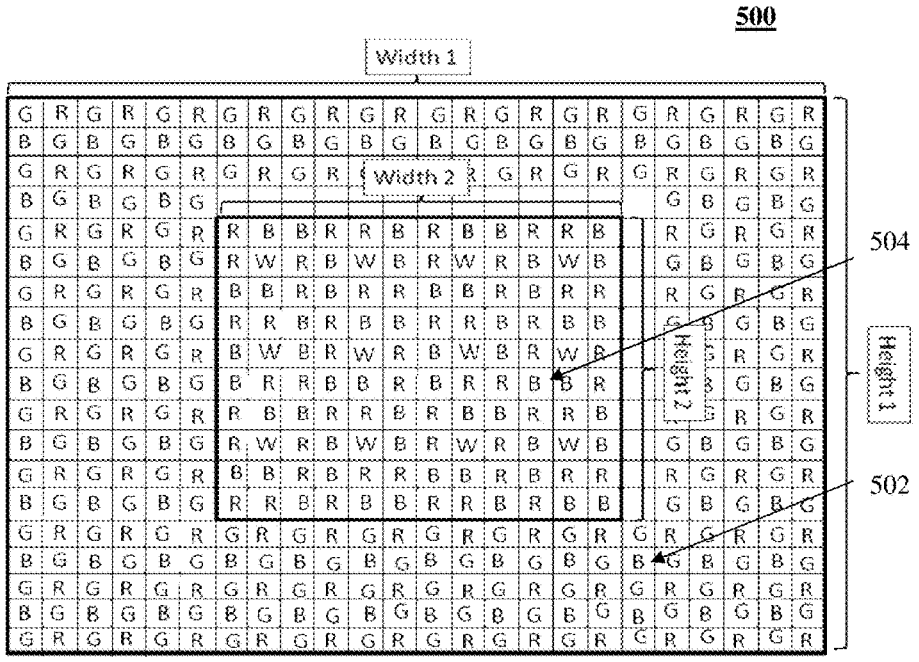
FIG. 5 shows schematically yet another embodiment of a Wide camera sensor that may be implemented in a dual-aperture zoom imaging system disclosed herein.
Figure 6:
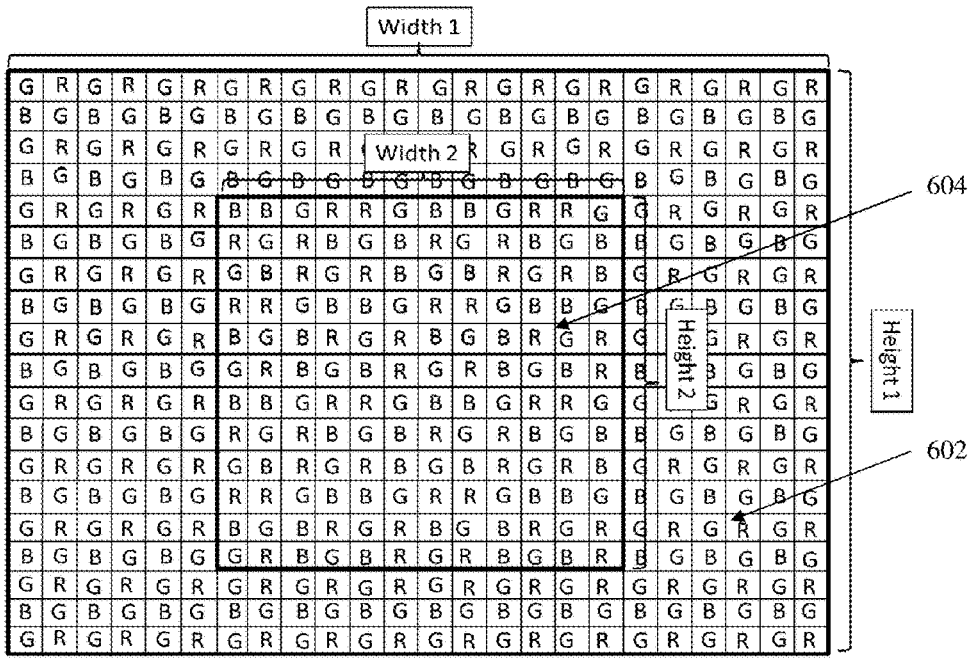
FIG. 6 shows schematically yet another embodiment of a Wide camera sensor that may be implemented in a dual-aperture zoom imaging system disclosed herein.

FIG. 5 shows schematically an embodiment of a Wide sensor 500 that may be implemented in a DAZI system such as system 100. Sensor 500 has a non-overlap area 502 with a Bayer CFA and an overlap area 504 covered by a non-standard CFA with a repetition of a 6×6 micro-cell in which the color filter order is RBBRRB-RWRBWB-BBRBRR-RRBRBB-BWBRWR-BRRBBR, where "W" represents White or Clear pixels. In the overlap area, R and B are sampled at a higher frequency than in a standard CFA. For example, in a Bayer pixel order, the Red average sampling rate ("$R_s$") is 0.25 (sampled once for every 4 pixels). In the overlap area pattern, $R_s$ is 0.44.

FIG. 6 shows schematically an embodiment of a Wide sensor 600 that may be implemented in a DAZI system such as system 100. Sensor 600 has a non-overlap area 602 with a Bayer CFA and an overlap area 604 covered by a non-standard CFA with a repetition of a 6×6 micro-cell in which the color filter order is BBGRRG-RGRBGB-GBRGRB-RRGBBG-BGBRGR-GRBGBR. In the overlap area, R and B are sampled at a higher frequency than in a standard CFA. For example, in the overlap area pattern, $R_s$ is 0.33 vs. 0.25 in a Bayer pixel order.

Figure 7:
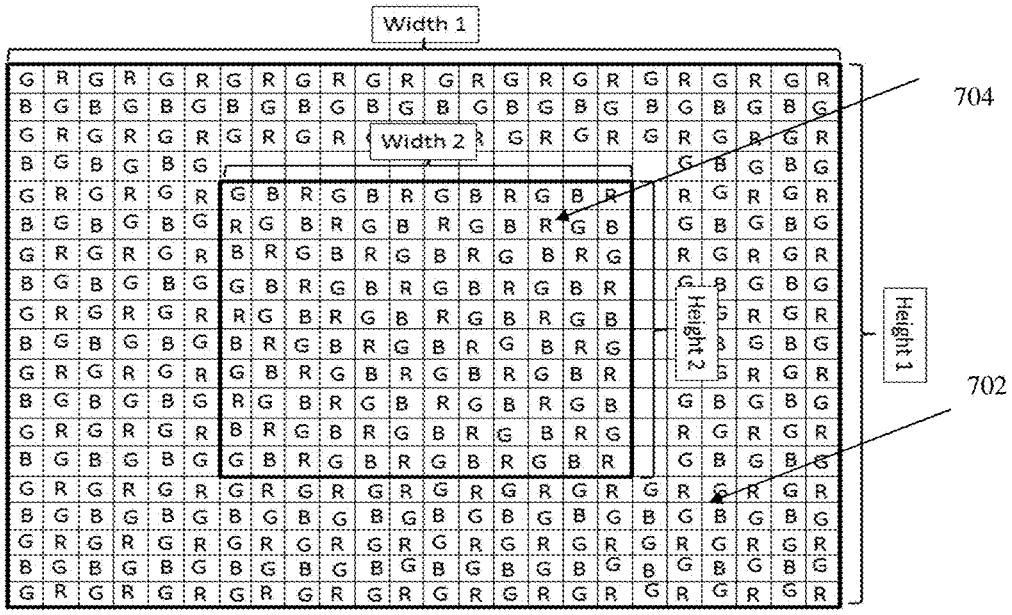
FIG. 7 shows schematically yet another embodiment of a Wide camera sensor that may be implemented in a dual-aperture zoom imaging system disclosed herein.

FIG. 7 shows schematically an embodiment of a Wide sensor 700 that may be implemented in a DAZI system such as system 100. Sensor 700 has a non-overlap area 702 with a Bayer CFA and an overlap area 704 covered by a non-standard CFA with a repetition of a 3×3 micro-cell in which the color filter order is GBR-RGB-BRG. In the overlap area, R and B are sampled at a higher frequency than in a standard CFA. For example, in the overlap area pattern, $R_s$ is 0.33 vs. 0.25 in a Bayer pixel order.

Figure 8:
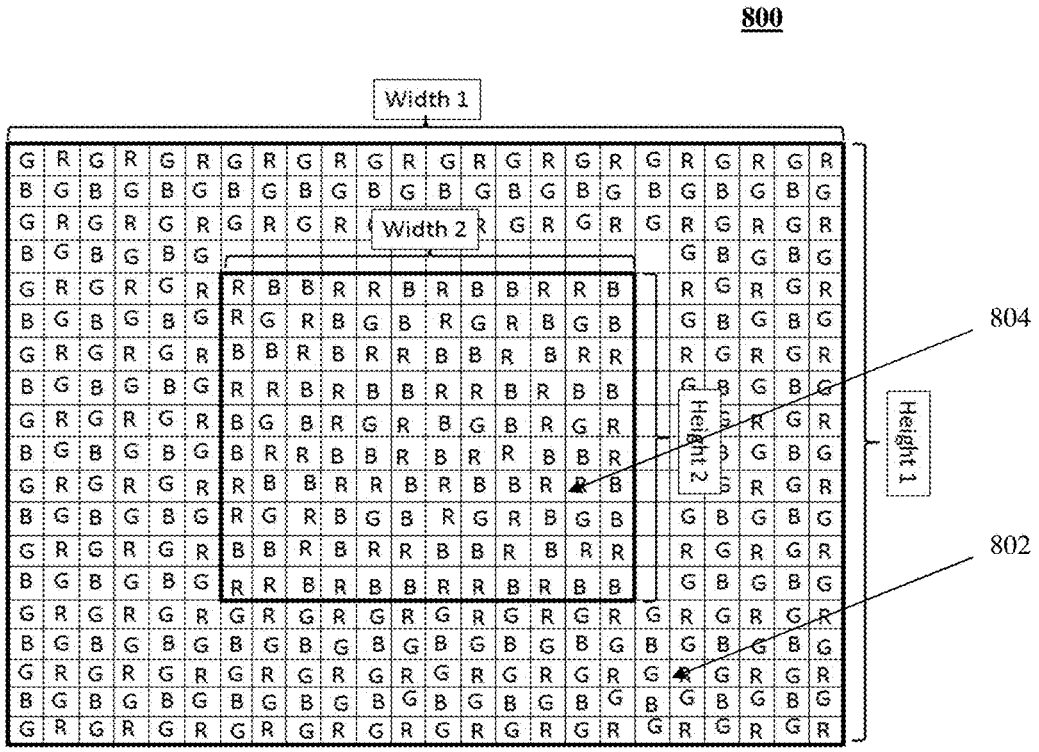
FIG. 8 shows schematically yet another embodiment of a Wide camera sensor that may be implemented in a dual-aperture zoom imaging system disclosed herein.

FIG. 8 shows schematically an embodiment of a Wide sensor 800 that may be implemented in a DAZI system such as system 100. Sensor 800 has a non-overlap area 802 with a Bayer CFA and an overlap area 804 covered by a non-standard CFA with a repetition of a 6×6 micro-cell in which the color filter order is RBBRRB-RGRBGB-BBRBRR-RRBRBB-BGBRGR-BRRBBR. In the overlap area, R and B are sampled at a higher frequency than in a standard CFA. For example, in the overlap area pattern, $R_s$ is 0.44 vs. 0.25 in a Bayer pixel order.

Figure 9:
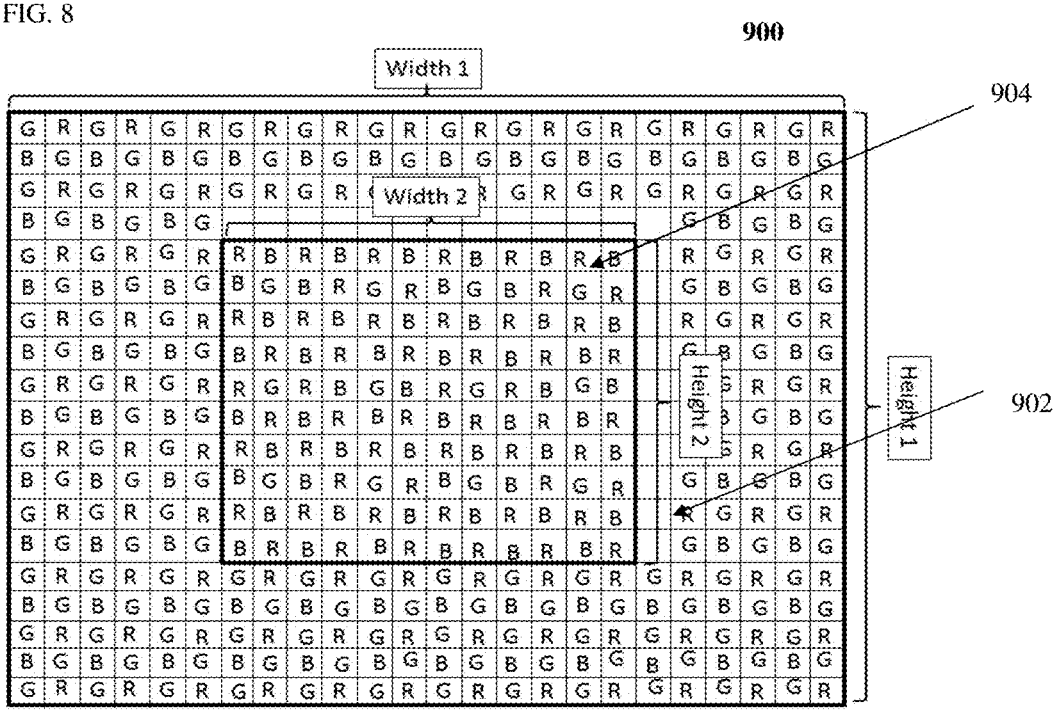
FIG. 9 shows schematically yet another embodiment of a Wide camera sensor that may be implemented in a dual-aperture zoom imaging system disclosed herein.

FIG. 9 shows schematically an embodiment of a Wide sensor 900 that may be implemented in a DAZI system such as system 100. Sensor 900 has a non-overlap area 902 with a Bayer CFA and an overlap area 904 covered by a non-standard CFA with a repetition of a 6×6 micro-cell in which the color filter order is RBRBRB-BGBRGR-RBRBRB-BRBRBR-RGRBGB-BRBRBR. In the overlap area, R and B are sampled at a higher frequency than in a standard CFA. For example, in the overlap area pattern, $R_s$ is 0.44 vs. 0.25 in a Bayer pixel order.

Processing Flow

Figure 10:
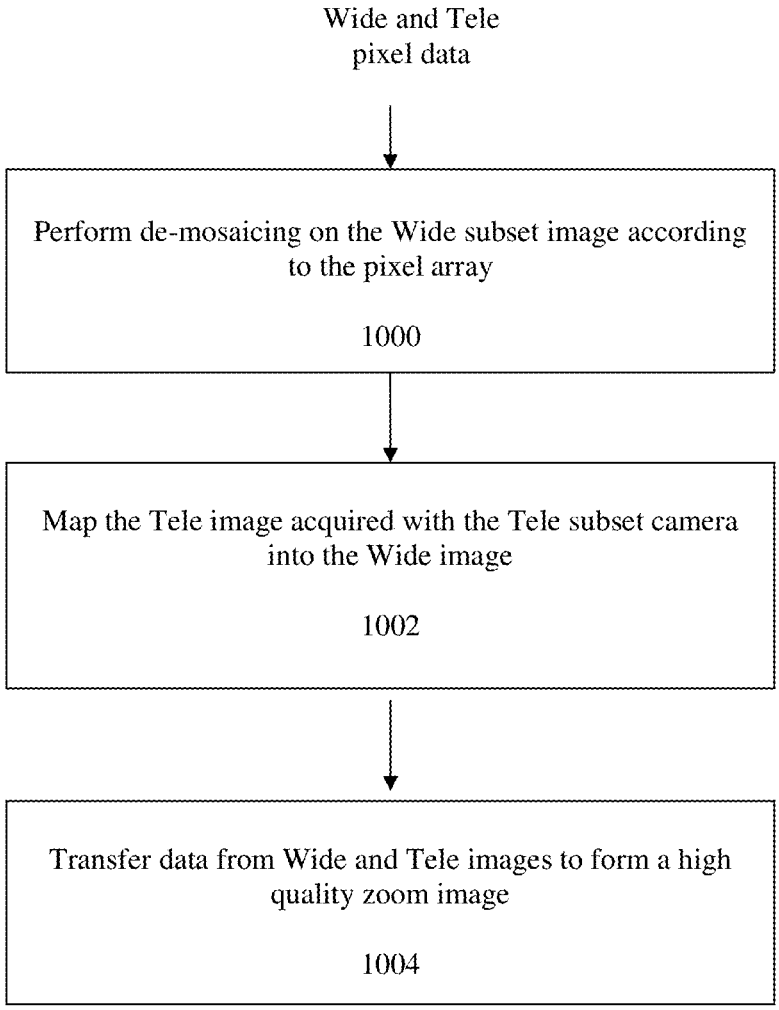
FIG. 10 shows a schematically in a flow chart an embodiment of a method disclosed herein for acquiring and outputting a zoom image.

In use, an image is acquired with imaging system 100 and is processed according to steps illustrated in a flowchart shown in FIG. 10. In step 1000, demosaicing is performed on the Wide overlap area pixels (which refer to the Tele image FOV) according to the specific CFA pattern. If the CFA in the Wide overlap area is a standard CFA, a standard demosaicing process may be applied to it. If the CFA in the Wide overlap area is non-standard CFA, the overlap and non-overlap subsets of pixels may need different demosaicing processes. That is, the Wide overlap area may need a non-standard demosaicing process and the Wide non-overlap area may need a standard demosaicing process. Exemplary and non-limiting non-standard demosaicing interpolations for the overlap area of each of the Wide sensors shown in FIGS. 2-9 are given in detail below. The aim of the demosaicing is to reconstruct missing colors in each pixel. Demosaicing is applied also to the Tele sensor pixels if the Tele sensor is not a Clear only sensor. This will result in a Wide subset color image where the colors (in the overlap area) hold higher resolution than those of a standard CFA pattern. In step 1002, the Tele image is registered (mapped) into the Wide image. The mapping includes finding correspondences between pixels in the two images. In step 1002, actual registration is performed on luminance Tele and Wide images (respectively $Luma_{Tele}$ and $Luma_{wide}$) calculated from the pixel information of the Tele and Wide cameras. These luminance images are estimates for the scene luminance as captured by each camera and do not include any color information. If the Wide or Tele sensors have CFAs, the calculation of the luminance images is performed on the respective demosaiced images. The calculation of the Wide luminance image varies according to the type of non-standard CFA used in the Wide overlap area. If the CFA permits calculation of a full RGB demosaiced image, the luminance image calculation is straightforward. If the CFA is such that it does not permit calculation of a full RGB demosaiced image, the luminance image is estimated from the available color channels. If the Tele sensor is a Clear sensor, the Tele luminance image is just the pixel information. Performing the registration on luminance images has the advantage of enabling registration between images captured by sensors with different CFAs or between images captured by a standard CFA or non-standard CFA sensor and a standard CFA or Clear sensor and avoiding color artifacts that may arise from erroneous registration.

In step 1004, the data from the Wide and Tele images is processed together with the registration information from step 1002 to form a high quality output zoom image. In cases where the Tele sensor is a Clear only sensor, the high resolution luminance component is taken from the Tele sensor and color resolution is taken from the Wide sensor. In cases where the Tele sensor includes a CFA, both color and luminance data are taken from the Tele subset to form the high quality zoom image. In addition, color and luminance data is taken from the Wide subset.

Exemplary Process for Fusing a Zoom Image

1. Special Demosaicing

In this step, the Wide image is interpolated to reconstruct the missing pixel values. Standard demosaicing is applied in the non-overlap area. If the overlap area includes a standard CFA, standard demosaicing is applied there as well. If the overlap area includes a non-standard CFA, a special demosaicing algorithm is applied, depending on the CFA pattern used. In addition, in case the Tele sensor has a CFA, standard demosaicing is applied to reconstruct the missing pixel values in each pixel location and to generate a full RGB color image.

2. Registration Preparation

Tele image: a luminance image $Luma_{Tele}$ is calculated from the Tele sensor pixels. If the Tele subset has a Clear sensor, $_{LumaTele}$ is simply the sensor pixels data. If the Tele subset has a standard CFA, $_{LumaTele}$ is calculated from the demosaiced Tele image.

Wide image: as a first step, in case the Wide overlap CFA permits estimating the luminance component of the image, the luminance component is calculated from the demosaiced Wide image, $Luma_{Wide}$. If the CFA is one of those depicted in FIGS. 4-9, a luminance image is calculated first. If the CFA is one of the CFAs depicted in FIG. 2 or FIG. 3, a luminance image is not calculated. Instead, the following registration step is performed between a weighted average of the demosaiced channels of the Wide image and $Luma_{Tele}$. For convenience, this weighted average image is also denoted $Luma_{Wide}$. For example, if the Wide sensor CFA in the overlap region is as shown in FIG. 2, the demosaiced channels $R_{Wide}$ and $B_{Wide}$ are averaged to create $Luma_{Wide}$ according to $Luma_{Wide}=(f1*R_{Wide}+f2*B_{Wide})/(f1+f2)$, where f1 may be f1=1 and f2 may be f2=1.

Low-pass filtering is applied on the Tele luminance image in order to match its spatial frequency content to that of the $Luma_{Wide}$ image. This improves the registration performance, as after low-pass filtering the luminance images become more similar. The calculation is $Luma_{Tele}$→Low pass filter→$Luma_{Tele}^{LP}$, where "LP" denotes an image after low pass filtering.

3. Registration of $Luma_{Wide}$ and $Luma_{Tele}^{LP}$

This step of the algorithm calculates the mapping between the overlap areas in the two luminance images. The registration step does not depend on the type of CFA used (or the lack thereof), as it is applied on luminance images. The same registration step can therefore be applied on Wide and Tele images captured by standard CFA sensors, as well as by any combination of CFAs or Clear sensor pixels disclosed herein. The registration process chooses either the Wide image or the Tele image to be a primary image. The other image is defined as an auxiliary image. The registration process considers the primary image as the baseline image and registers the overlap area in the auxiliary image to it, by finding for each pixel in the overlap area of the primary image its corresponding pixel in the auxiliary image. The output image point of view is determined according to the primary image point of view (camera angle). Various correspondence metrics could be used for this purpose, among which are a sum of absolute differences and correlation.

In an embodiment, the choice of the Wide image or the Tele image as the primary and auxiliary images is based on the ZF chosen for the output image. If the chosen ZF is larger than the ratio between the focal-lengths of the Tele and Wide cameras, the Tele image is set to be the primary image and the Wide image is set to be the auxiliary image. If the chosen ZF is smaller than or equal to the ratio between the focal-lengths of the Tele and Wide cameras, the Wide image is set to be the primary image and the Tele image is set to be the auxiliary image. In another embodiment independent of a zoom factor, the Wide image is always the primary image and the Tele image is always the auxiliary image. The output of the registration stage is a map relating Wide image pixels indices to matching Tele image pixels indices.

4. Combination into a High Resolution Image

In this final step, the primary and auxiliary images are used to produce a high resolution image. One can distinguish between several cases:

a. If the Wide image is the primary image, and the Tele image was generated from a Clear sensor, $Luma_{Wide}$ is calculated and replaced or averaged with $Luma_{Tele}$ in the overlap area between the two images to create a luminance output image, matching corresponding pixels according to the registration map $Luma_{Out}=c1*Luma_{Wide}+c2*Luma_{Tele}$. The values of c1 and c2 may change between different pixels in the image. Then, RGB values of the output are calculated from $Luma_{Out}$ and $R_{Wide}$, $G_{Wide}$, and $B_{Wide}$.

b. If the Wide image is the primary image and the Tele image was generated from a CFA sensor, $Luma_{Tele}$ is calculated and is combined with $Luma_{Wide}$ in the overlap area between the two images, according to the flow described in 4a.

c. If the Tele image is the primary image generated from a Clear sensor, the RGB values of the output are calculated from the $Luma_{Tele}$ image and $R_{Wide}$, $G_{Wide}$, and $B_{Wide}$ (matching pixels according to the registration map).

d. If the Tele image is the primary image generated from a CFA sensor, the RGB values of the output (matching pixels according to the registration map) are calculated either by using only the Tele image data, or by also combining data from the Wide image. The choice depends on the zoom factor.

Certain portions of the registered Wide and Tele images are used to generate the output image based on the ZF of the output image. In an embodiment, if the ZF of the output image defines a FOV smaller than the Tele FOV, the fused high resolution image is cropped to the required field of view and digital interpolation is applied to scale up the image to the required output image resolution.

Exemplary and Non-Limiting Pixel Interpolations Specifications for the Overlap Area

FIG. 2

| | | |
|---|---|---|
| B11 | B12 | R13 |
| R21 | B22 | B23 |
| R31 | R32 | B33 |

In order to reconstruct the missing R22 pixel, we perform R22=(R31+R13)/2. The same operation is performed for all missing Blue pixels.

FIG. 3

| | | |
|---|---|---|
| R11 | B12 | R13 |
| B21 | R22 | B23 |
| R31 | B32 | R33 |

In order to reconstruct the missing B22 pixel, we perform B22=(B12+B21+B32+B23)/4. The same operation is performed for all missing Red pixels.

FIG. 4

| | | |
|---|---|---|
| Y11 | C12 | Y13 |
| C21 | Y22 | C23 |
| Y31 | C32 | Y33 |

In order to reconstruct the missing C22 pixel, we perform C22=(C12+C21+C32+C23)/4. The same operation is performed for all missing Yellow pixels.

FIG. 5

Case 1: W is Center Pixel

| | | |
|---|---|---|
| R11 | B12 | B13 |
| R21 | W22 | R23 |
| B31 | B32 | R33 |

In order to reconstruct the missing 22 pixels, we perform the following:

B22=(B12+B32)/2

R22=(R21+R23)/2

G22=(W22−R22−B22) (assuming that W includes the same amount of R, G and B colors).

Case 2: R22 is Center Pixel

| | | | |
|---|---|---|---|
| B11 | B12 | R13 | R14 |
| W21 | R22 | B23 | W24 |
| B31 | R32 | B33 | R34 |

B22=(B11+R33)/2

In order to reconstruct the missing 22 pixels, we perform the following:

W22=(2*W21+W24)/3

G22=(W22−R22−B22) (assuming that W contains the same amount of R, G and B colors). The same operation is performed for Blue as the center pixel.

FIG. 6

| | | | |
|---|---|---|---|
| B11 | B12 | G13 | R14 |
| R21 | G22 | R23 | B24 |
| G31 | B32 | R33 | G34 |
| R41 | R42 | G43 | B44 |

In order to reconstruct the missing 22 pixels, we perform the following:

B22=(B12+B32)/2

R22=(R21+R23)/2.

In order to reconstruct the missing 32 pixels, we perform the following:

G32=(2*G31+2*G22+G43)/5

R32=(R41+2*R42+2*R33+R23+R21)/7.

FIG. 7

| | | | |
|---|---|---|---|
| G11 | B12 | R13 | G14 |
| R21 | G22 | B23 | R24 |
| B31 | R32 | G33 | B34 |
| G41 | B42 | R43 | G44 |

In order to reconstruct the missing 22 pixels, we perform the following:

B22=(2*B12+2*B23+B31)/5

R22=(2*R21+2*R32+R13)/5 and similarly for all other missing pixels.

FIG. 8

| | | | |
|---|---|---|---|
| R11 | B12 | B13 | R14 |
| R21 | G22 | R23 | B24 |
| B31 | B32 | R33 | B34 |
| R41 | R42 | B43 | R44 |
| B51 | G52 | B53 | R54 |

In order to reconstruct the missing 22 pixels, we perform the following:

B22=(2*B12+2*B32+B13)/5

R22=(2*R21+2*R23+R11)/5.

In order to reconstruct the missing 32 pixels, we perform the following:

G32=(2*G22+G52)/3

R32=(2*R33+2*R42+R41+R21+R23)/7.

FIG. 9

| | | | |
|---|---|---|---|
| R11 | B12 | R13 | B14 |
| B21 | G22 | B23 | R24 |
| R31 | B32 | R33 | B34 |
| B41 | R42 | B43 | R44 |
| R51 | G52 | R53 | B54 |

In order to reconstruct the missing 22 pixels, we perform the following:

B22=(B12+B32+B23+B21)/4

R22=(R11+R13+R31+R33)/4.

In order to reconstruct the missing 32 pixels, we perform the following:

G32=(2*G22+G52)/3

R32=(R42+R31+R33)/3.

Triple-Aperture Zoom Imaging System with Improved Color Resolution

Figure 11A:
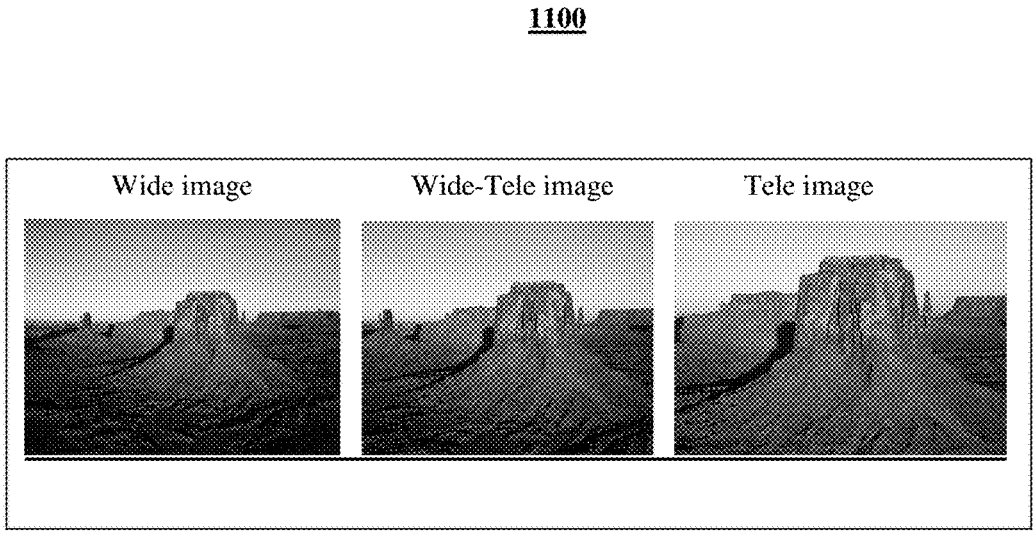
FIG. 11A shows exemplary images captured by a triple aperture zoom imaging system disclosed herein.
Figure 11B:
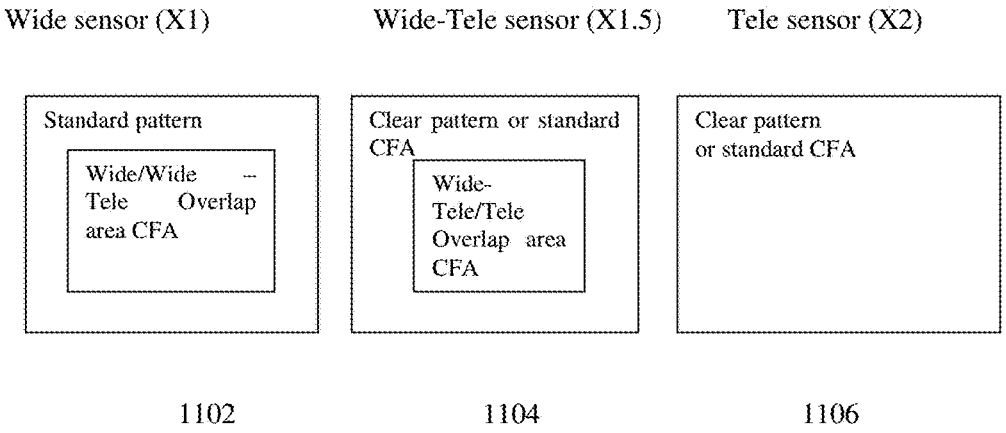
FIG. 11B illustrates schematically the three sensors of the triple aperture imaging system of FIG. 11A.

As mentioned, a multi-aperture zoom or non-zoom imaging system disclosed herein may include more than two apertures. A non-limiting and exemplary embodiment 1100 of a triple-aperture imaging system is shown in FIGS. 11A-11B. System 1100 includes a first Wide subset camera 1102 (with exemplarily X1), a second Wide subset camera (with exemplarily X1.5, and referred to as a "Wide-Tele" subset) and a Tele subset camera (with exemplarily X2). FIG. 11A shows exemplary images captured by imaging system 1100, while FIG. 11B illustrates schematically three sensors marked 1102, 1104 and 1106, which belong respectively to the Wide, Wide-Tele and Tele subsets. FIG. 11B also shows the CFA arrangements in each sensor: sensors 1102 and 1104 are similar to Wide sensors described above with reference to any of FIGS. 2-9, in the sense that they include an overlap area and a non-overlap area. The overlap area includes a non-standard CFA. In both Wide sensors, the non-overlap area may have a Clear pattern or a standard CFA. Thus, neither Wide subset is solely a Clear channel camera. The Tele sensor may be Clear or have a standard Bayer CFA or a standard non-Bayer CFA. In use, an image is acquired with imaging system 1100 and processed as follows: demosaicing is performed on the overlap area pixels of the Wide and Wide-Tele sensors according to the specific CFA pattern in each overlap area. The overlap and non-overlap subsets of pixels in each of these sensors may need different demos aicing. Exemplary and non-limiting demosaicing specifications for the overlap area for Wide sensors shown in FIGS. 2-9 are given above. The aim is to reconstruct the missing colors in each and every pixel. In cases in which the Tele subset sensor is not Clear only, demosaicing is performed as well. The Wide and Wide-Tele subset color images acquired this way will have colors (in the overlap area) holding higher resolution than that of a standard CFA pattern. Then, the Tele image acquired with the Tele sensor is registered (mapped) into the respective Wide image. The data from the Wide, Wide-Tele and Tele images is then processed to form a high quality zoom image. In cases where the Tele subset is Clear only, high Luma resolution is taken from the Tele sensor and color resolution is taken from the Wide sensor. In cases where the Tele subset includes a CFA, both color and Luma resolution is taken from the Tele subset. In addition, color resolution is taken from the Wide sensor. The resolution of the fused image may be higher than the resolution of both sensors.

While this disclosure has been described in terms of certain embodiments and generally associated methods, alterations and permutations of the embodiments and methods will be apparent to those skilled in the art. For example, multi-aperture imaging systems with more than two Wide or Wide-Tele subsets (and sensors) or with more than one Tele subset (and sensor) may be constructed and used according to principles set forth herein. Similarly, non-zoom multi-aperture imaging systems with more than two sensors, at least one of which has a non-standard CFA, may be constructed and used according to principles set forth herein. The disclosure is to be understood as not limited by the specific embodiments described herein, but only by the scope of the appended claims.

What is claimed is:

[1. A multi-aperture imaging system comprising:

a) a first camera that provides a first camera image, the first camera having a first sensor with a first plurality of sensor pixels covered at least in part with a non-standard color filter array (CFA) used to increase a specific color sampling rate relative to a same color sampling rate in a standard CFA, wherein the non-standard CFA includes a repetition of a n×n micro-cell where n=4 and wherein each micro-cell includes a BBRR-RBBR-RRBB-BRRB color filter order;

b) a second camera that provides a second camera image, the second camera having a second sensor with a second plurality of sensor pixels, the second plurality of sensor pixels being either Clear or covered with a standard CFA, wherein the second camera image has an overlap area with the first camera image; and c) a processor configured to process the first and second camera images into a fused output image, wherein in the overlap area pixels of the second camera image are registered with corresponding pixels of the first camera image.]

[2. A multi-aperture imaging system comprising:

a) a first camera that provides a first camera image, the first camera having a first sensor with a first plurality of sensor pixels covered at least in part with a non-standard color filter array (CFA) used to increase a specific color sampling rate relative to a same color sampling rate in a standard CFA, wherein the non-standard CFA includes a repetition of a n×n micro-cell where n=6 and wherein each micro-cell includes a color filter order selected from the group consisting of RBBRRB-RWRBWB-BBRBRR-RRBRBB-BWBRWR-BRRBBR, BBGRRG-RGRBGB-GBRGRB-RRGBBG-BGBRGR-GRBGBR, RBBRRB-RGRBGB-BBRBRR-RRBRBB-BGBRGR-BRRBBR and RBRBRB-BGBRGR-RBRBRB-BRBRBR-RGRBGB-BRBRBR;

b) a second camera that provides a second camera image, the second camera having a second sensor with a second plurality of sensor pixels, the second plurality of sensor pixels being either Clear or covered with a standard CFA, wherein the second camera image has an overlap area with the first camera image; and c) a processor configured to process the first and second camera images into a fused output image, wherein in the overlap area pixels of the second camera image are registered with corresponding pixels of the first camera image.]

[3. The multi-aperture imaging system of claim 1, wherein the first camera is a Wide camera with a field of view $FOV_w$ and wherein the second camera is a Tele camera with a field of view $FOV_T$ smaller than $FOV_w$.]

[4. A method of acquiring images by a multi-aperture imaging system, the method comprising:

a) providing a first image generated by a first camera of the imaging system, the first camera having a first field of view ($FOV_1$);

b) providing a second image generated by a second camera of the imaging system, the second camera having a second field of view ($FOV_2$) such that $FOV_2<FOV_1$, the second image having an overlap area with the first image; and c) fusing the first and second images into a fused image, wherein the fusing includes applying a registration process between the first and second images, the registration process including:

i. extracting a first Luma image from the first image ii. extracting a second Luma image from the second image, iii. applying low-pass filtering on the second Luma image in order to match its spatial frequency content to that of the first Luma image and to generate a low-pass second Luma image, and iv. applying registration on the low-pass second Luma image and the first Luma image, wherein the non-standard CFA includes a repetition of a n×n micro-cell where n=4 and wherein each micro-cell includes a BBRR-RBBR-RRBB-BRRB color filter order.]

[5. The method of claim 4, wherein n=6 instead of n=4 and wherein instead of each micro-cell including a BBRR-RBBR-RRBB-BRRB color filter order, each micro-cell includes a color filter order selected from the group consisting of RBBRRB-RWRBWB-BBRBRR-RRBRBB-BWBRWR-BRRBBR, BBGRRG-RGRBGB-GBRGRB-RRGBBG-BGBRGR-GRBGBR, RBBRRB-RGRBGB-BBRBRR-RRBRBB-BGBRGR-BRRBBR and RBRBRB-BGBRGR-RBRBRB-BRBRBR-RGRBGB-BRBRBR.]

*6. A multi-aperture imaging system, comprising:*

*a) a first camera that provides a first image, the first camera having a fixed first field of view (FOV1) and a first sensor with a first plurality of sensor pixels covered at least in part with a first color filter array (CFA);*

*b) a second camera that provides a second image, the second camera having a fixed second field of view (FOV2) such that FOV2<FOV1 and a second sensor with a second plurality of sensor pixels, the second image having an overlap area with the first image, the first sensor having a sensor overlap area with the second sensor and a sensor non-overlap area; and*

*c) a third camera that provides a third image, the third camera having a fixed third field of view (FOV3) such that FOV3<FOV2, and a third sensor with a third plurality of sensor pixels, the third image having an overlap area with the second image; and*

*d) a processor configured to provide an output image based on a zoom factor (ZF) input that defines a respective field of view (FOVZF), such that for FOV2<FOVZF<FOV1 the processor is further configured to select the first image as a primary image, to register the overlap area of the second image to the first*

*image to obtain a fused image, and to provide the fused image as the output image from the point of view of the first camera,*

*wherein a CFA pattern of the first CFA in the sensor overlap area differs from a CFA pattern of the first CFA in the sensor non-overlap area, and wherein a demosaicing process applied to the first CFA in the sensor overlap area differs from a demosaicing process applied to the CFA pattern of the first CFA in the sensor non-overlap area.*

*7. The multi-aperture imaging system of claim 6, wherein if FOV3>FOVZF, then the processor is further configured to provide an output image from the point of view of the third camera.*

*8. A multi-aperture imaging system, comprising:*

*a) a first camera that provides a first image, the first camera having a fixed first field of view (FOV1) and a first sensor with a first plurality of sensor pixels covered at least in part with a first color filter array (CFA);*

*b) a second camera that provides a second image, the second camera having a fixed second field of view (FOV2) such that FOV2<FOV1 and a second sensor with a second plurality of sensor pixels, the second image having an overlap area with the first image, the first sensor having a sensor overlap area with the second sensor and a sensor non-overlap area; and*

*c) a third camera that provides a third image, the third camera having a fixed third field of view (FOV3) such that FOV3<FOV2, and a third sensor with a third plurality of sensor pixels, the third image having an overlap area with the second image; and*

*d) a processor configured to provide an output image based on a zoom factor (ZF) input that defines a respective field of view (FOVZF), such that for FOV3<FOVZF<FOV2 the processor is further configured to select the second image as a primary image, to register the overlap area of the third image to the second image to obtain a fused image, and to provide the fused image as the output image from the point of view of the second camera,*

*wherein a CFA pattern of the first CFA in the sensor overlap area differs from a CFA pattern of the first CFA in the sensor non-overlap area, and wherein a demosaicing process applied to the first CFA in the sensor overlap area differs from a demosaicing process applied to the CFA pattern of the first CFA in the sensor non-overlap area.*

*9. The multi-aperture imaging system of claim 8, wherein if FOV3>FOVZF, then the processor is further configured to provide the output image from the point of view of the third camera.*

*10. A method of acquiring images by a multi-aperture imaging system, comprising:*

*a) providing a first image generated by a first camera of the imaging system, the first camera having a fixed first field of view (FOV1) and a first sensor with a first plurality of sensor pixels covered at least in part with a first color filter array (CFA);*

*b) providing a second image generated by a second camera of the imaging system, the second camera having a fixed second field of view (FOV2) such that FOV2<FOV1, and a second sensor with a second plurality of sensor pixels, the second image having an overlap area with the first image, the first sensor having a sensor overlap area with the second sensor and a sensor non-overlap area;*

*c) providing a third image generated by a third camera of the imaging system, the third camera having a fixed third field of view (FOV3) such that FOV3<FOV2, and a third sensor with a third plurality of sensor pixels, the third image having an overlap area with the second image; and*

*d) using a processor to provide an output image from a point of view of the first camera, the second camera, or the third camera, based on a zoom factor (ZF) input that defines a respective field of view (FOVZF) such that:*

*if FOV2<FOVZF<FOV1, then the processor is configured to select the first image as a primary image, to register the overlap area of the second image to the first image to obtain a fused image and to provide the fused image as the output image from the point of view of the first camera,*

*if FOV3<FOVZF<FOV2, then the processor is configured to select the second image as a primary image, to register the overlap area of the third image to the second image to obtain a fused image and to provide the fused image as the output image from the point of view of the second camera, and*

*if FOV3>FOVZF, then the processor is configured to provide an output image from the point of view of the third camera,*

*wherein a CFA pattern of the first CFA in the sensor overlap area differs from a CFA pattern of the first CFA in the sensor non-overlap area, and wherein a demosaicing process applied to the first CFA in the sensor overlap area differs from a demosaicing process applied to the CFA pattern of the first CFA in the sensor non-overlap area.*

* * * * *